US008212872B2

(12) United States Patent
Sablak

(10) Patent No.: US 8,212,872 B2
(45) Date of Patent: Jul. 3, 2012

(54) TRANSFORMABLE PRIVACY MASK FOR VIDEO CAMERA IMAGES

(75) Inventor: Sezai Sablak, Lancaster, PA (US)

(73) Assignee: Robert Bosch GmbH, Stuttgart (DE)

( * ) Notice: Subject to any disclaimer, the term of this patent is extended or adjusted under 35 U.S.C. 154(b) by 2727 days.

(21) Appl. No.: 10/858,817

(22) Filed: Jun. 2, 2004

(65) Prior Publication Data

US 2005/0270371 A1 Dec. 8, 2005

(51) Int. Cl.
*H04N 7/18* (2006.01)
(52) U.S. Cl. ............................................. 348/143
(58) Field of Classification Search .................... 348/143
See application file for complete search history.

(56) References Cited

U.S. PATENT DOCUMENTS

| 3,943,561 | A | 3/1976 | Biddlecomb |
| 4,403,256 | A | 9/1983 | Green et al. |
| 4,410,914 | A | 10/1983 | Siau |
| 4,476,494 | A | 10/1984 | Tugayé |
| 4,897,719 | A | 1/1990 | Griffin |
| 4,959,725 | A | 9/1990 | Mandle |
| 5,012,347 | A | 4/1991 | Fournier |
| 5,237,405 | A | 8/1993 | Egusa et al. |
| 5,264,933 | A | 11/1993 | Rosser et al. |
| 5,353,392 | A | 10/1994 | Luquet et al. |
| 5,371,539 | A | 12/1994 | Okino et al. |
| 5,430,480 | A | 7/1995 | Allen et al. |
| 5,436,672 | A | 7/1995 | Medioni et al. |
| 5,438,360 | A | 8/1995 | Edwards |
| 5,491,517 | A | 2/1996 | Kreitman et al. |
| 5,502,482 | A | 3/1996 | Graham |
| 5,517,236 | A | 5/1996 | Sergeant et al. |
| 5,528,319 | A | 6/1996 | Austin ......................... 348/835 |
| 5,563,652 | A | 10/1996 | Toba et al. |
| 5,608,703 | A | 3/1997 | Washisu |

(Continued)

FOREIGN PATENT DOCUMENTS

EP 0557007 A2 8/1993

(Continued)

OTHER PUBLICATIONS

"Computer vision sensor for autonomous helicopter hover stabilization", Carl-Henrik Oertel, SPIE vol. 3088, pp. 121-129, (1977).

(Continued)

*Primary Examiner* — Jayanti K Patel
*Assistant Examiner* — Richard Torrente
(74) *Attorney, Agent, or Firm* — Faegre Baker Daniels LLP

(57) ABSTRACT

A system including a camera, display screen and processing device. A privacy mask obscures a portion of the displayed images. The processing device transforms the privacy mask in accordance with changes in the field of view of the camera, wherein, in a first field of view, the privacy mask is defined by a plurality of vertices having coordinates (x1, y1), . . . (xn, yn), and, in a second field of view, the processing device determines transformed coordinates, (x1', y1'), . . . (xn', yn'), for each of the vertices based upon changes in the field of view of the camera. The privacy mask is definable by pixel rows and the processing device identifies opposing ends of a plurality of the pixel rows, each of the identified ends defining one vertex of the privacy mask. The privacy mask may also include an unmasked area completely encircled by masked area.

24 Claims, 7 Drawing Sheets

U.S. PATENT DOCUMENTS

| | | | |
|---|---|---|---|
| 5,610,653 A | 3/1997 | Abeassis | |
| 5,627,616 A | 5/1997 | Sergeant et al. | |
| 5,629,984 A | 5/1997 | McManis | 380/54 |
| 5,629,988 A | 5/1997 | Burt et al. | |
| 5,648,815 A | 7/1997 | Toba | |
| 5,731,846 A | 3/1998 | Kreitman et al. | |
| 5,754,225 A | 5/1998 | Naganuma | |
| 5,798,786 A | 8/1998 | Lareau et al. | |
| 5,798,787 A | 8/1998 | Yamaguchi et al. | |
| 5,801,770 A | 9/1998 | Paff et al. | 348/211 |
| 5,835,138 A | 11/1998 | Kondo | |
| 5,909,242 A | 6/1999 | Kobayashi et al. | |
| 5,926,212 A | 7/1999 | Kondo | |
| 5,953,079 A | 9/1999 | Burl et al. | |
| 5,963,248 A | 10/1999 | Ohkawa et al. | |
| 5,963,371 A | 10/1999 | Needham et al. | 359/464 |
| 5,969,755 A | 10/1999 | Courtney | |
| 5,973,733 A | 10/1999 | Gove | |
| 5,982,420 A | 11/1999 | Ratz | |
| 6,067,399 A | 5/2000 | Berger | |
| 6,100,925 A | 8/2000 | Rosser et al. | |
| 6,144,405 A | 11/2000 | Toba | |
| 6,154,317 A | 11/2000 | Segerstrom et al. | |
| 6,173,087 B1 | 1/2001 | Kumar | |
| 6,181,345 B1 | 1/2001 | Richard | |
| 6,208,379 B1 | 3/2001 | Oya et al. | |
| 6,208,386 B1 | 3/2001 | Wilf et al. | |
| 6,211,912 B1 | 4/2001 | Shahraray | |
| 6,211,913 B1 | 4/2001 | Hansen et al. | |
| 6,263,088 B1 | 7/2001 | Crabtree et al. | |
| 6,295,367 B1 | 9/2001 | Crabtree et al. | |
| 6,384,871 B1 | 5/2002 | Wilf et al. | |
| 6,396,961 B1 | 5/2002 | Wixson et al. | |
| 6,424,370 B1 | 7/2002 | Courtney | |
| 6,437,819 B1 | 8/2002 | Loveland | |
| 6,441,864 B1 | 8/2002 | Minami et al. | |
| 6,442,474 B1 | 8/2002 | Trajkovic et al. | |
| 6,459,822 B1 | 10/2002 | Hathaway et al. | |
| 6,478,425 B2 | 11/2002 | Trajkovic et al. | |
| 6,509,926 B1 | 1/2003 | Mills et al. | |
| 6,628,711 B1 | 9/2003 | Mathew et al. | |
| RE38,420 E | 2/2004 | Thomas | |
| 6,734,901 B1 | 5/2004 | Kudo et al. | |
| 6,778,210 B1 | 8/2004 | Sugahara et al. | |
| 6,781,622 B1 | 8/2004 | Sato et al. | |
| 7,218,342 B2 * | 5/2007 | Kobayashi et al. | 348/211.8 |
| 2002/0008758 A1 | 1/2002 | Broemmelsiek et al. | |
| 2002/0030741 A1 | 3/2002 | Broemmelsiek | |
| 2002/0140813 A1 | 10/2002 | Trajkovic et al. | |
| 2002/0140814 A1 | 10/2002 | Cohen-Solal et al. | |
| 2002/0167537 A1 | 11/2002 | Trajkovic | |
| 2002/0168091 A1 | 11/2002 | Trajkovic | |
| 2003/0103139 A1 * | 6/2003 | Pretzer et al. | 348/143 |
| 2003/0137589 A1 | 7/2003 | Miyata | 348/211.7 |
| 2003/0227555 A1 | 12/2003 | Kobayashi et al. | 348/231.6 |
| 2004/0130628 A1 | 7/2004 | Stavely | |
| 2005/0157169 A1 | 7/2005 | Brodsky et al. | |

FOREIGN PATENT DOCUMENTS

| | | |
|---|---|---|
| EP | 1 081 955 A2 | 3/2001 |
| GB | 2305051 A | 3/1997 |
| GB | 2316255 A | 2/1998 |
| GB | 2411310 A | 8/2005 |
| GB | 2414885 A | 12/2005 |
| JP | 62229082 | 10/1987 |
| JP | 032786211 | 12/1991 |
| JP | 08-123784 A | 5/1996 |
| JP | 2001-061137 A | 3/2001 |
| WO | WO 94/28377 | 12/1994 |
| WO | WO 98/47117 A1 | 10/1998 |
| WO | WO 01/69930 A1 | 9/2001 |
| WO | WO 01/69932 A1 | 9/2001 |

OTHER PUBLICATIONS

"Development of image stabilization system for remote operation of walking robots", Kurazume et al, IEEE vol. 2, pp. 1856-1861, (2000).

"Dynamic Stabilization of a Pan and Tilt Camera for Submarine Image Visualization", Armel Cretual et al., Computer Vision and Image Understanding 79, pp. 47-65, (2000).

"Stabilization, restoration and resolution enhancement of a video sequence captured by a moving and vibrating platform", A. Stern, et al., Applications of Digital Image Processing XXIV, pp. of SPIE vol. 4472 (2001) pp. 65-745/24/04.

"A Stable Vision System for Moving Vehicles", Jesse S. Jin et al., IEEE Transactions of Intelleigent Transportation System, vol. 1, No. 1, Mar. 2000, pp. 32-39.

"Camera Tracking for Augmented Reality Media", Bolan Jiang et al., 2000 IEEE, vol. III, pp. 1637-1640.

"Fast Normalized Cross-Correlation", J.P. Lewis, expanded version of a paper from Vision Interface, 1995 (reference [10]).

T.E. Boult, R. Michaels, A. Erkan, P. Lewis, C. Powers, C. Qian, and W. Yin, "*Frame-Rate Multi-Body Tracking for Surveillance,*" Proceeding of the DARPA Image Understanding Workshop, Nov. 1998.

I. Haritao lu, D. Harwood, and L.S. Davis, "*W4: Real-time surveillance of People and their Activities,*" IEEE Trans. Pattern Analysis and Machine Intelligence, 22(8): 809-830, Aug. 2000.

I. Haritao lu, et al., "*W4: Who? When? Where? What? A real Time System for Detecting and Tracking People,*" International Conference on Face and Gesture Recognition; Nara, Japan, Apr. 14-16, 1998.

J. Segen and G. Pingali, "*A Camera-based System for Tracking People in Real Time,*" In Proc. International Conference on Pattern Recognition, pp. 63-67, 1996.

C.R. Wren, A. Azarbayejani, T. Darrell, and A.P. Pentland, "*Pfinder: Real-time Tracking of the Human Body,*" IEEE Trans. Pattern Analysis and Machine Intelligence, 19(7): 780-785, Jul. 1997.

New Product Announcement; Integral Technologies, Inc., First Line DVA Digital Recorder, Mar. 1, 2002.

Product Brochure; Primary Image, Videotracker Digital Video Motion Detector, 1998.

Product Brochure, Fire Sentry Corporation, VSD-8 Visual Smoke Detection System, 2001.

\* cited by examiner

TRANSFORMABLE PRIVACY MASK FOR VIDEO CAMERA IMAGES

BACKGROUND OF THE INVENTION

1. Field of the Invention

The present invention relates to privacy masking for video camera images and, more particularly, to a privacy mask which is transformed to account for changes in the field of view of the camera.

2. Description of the Related Art

Video surveillance camera systems are found in many locations and may include either fixed cameras that have a fixed field of view and/or adjustable cameras that can pan, tilt and/or zoom to adjust the field of view of the camera. The video output of such cameras is typically communicated to a central location where it is displayed on one of several display screens and where security personnel may monitor the display screens for suspicious activity.

When employing a video surveillance camera system, the area within the field of view of a camera in the system may include both the area for which monitoring is intended and private areas. In such circumstances, it is known to provide privacy masking which obscures that portion of the video image which corresponds to the private area. When the camera is a pan, tilt, zoom camera having an adjustable field of view, the portion of the displayed image corresponding to the private area will change as the field of view of the camera changes. Although various systems have addressed the need to provide privacy masks in a surveillance camera system, there remains a need to improve the performance of such systems.

SUMMARY OF THE INVENTION

The present invention provides a surveillance camera system with privacy masking that allows for the warping of the mask as the field of view of the camera changes and for finely tailoring the mask to fit the area for which privacy is desired.

The invention comprises, in one form thereof, a surveillance camera system that includes a camera having an adjustable field of view, a display screen displaying images acquired by the camera and a processing device operably coupled to the camera and the display screen. The processing device is configured to allow a user to define a privacy mask obscuring a portion of the displayed images. The processing device is further configured to transform the privacy mask in accordance with changes in the field of view of the camera, wherein, in a first field of view, the privacy mask is defined by a plurality of vertices having coordinates $(x_1, y_1), \ldots (x_n, y_n)$, and, in a second field of view differing from the first field of view, the processing device determines transformed coordinates, $(x_1', y_1'), \ldots (x_n', y_n')$, for each of the vertices based upon changes in the field of view of the camera wherein the privacy mask and the transformed privacy mask obscure substantially common subject matter in both the first field of view and the second field of view respectively. Additionally, the privacy mask in the first field of view is definable by pixel rows and the processing device is configured to identify opposing ends of a plurality of the pixel rows, each of the identified ends defining one of the vertices of the privacy mask.

The invention comprises, in another form thereof, a surveillance camera system that includes a camera having an adjustable field of view, a display screen displaying images acquired by the camera and a processing device operably coupled to the camera and the display screen. The processing device is configured to allow a user to define a privacy mask obscuring a portion of the displayed images. The processing device is further configured to transform the privacy mask in accordance with changes in the field of view of the camera, wherein, in a first field of view, the privacy mask is defined by a plurality of vertices having coordinates $(x_1, y_1), \ldots (x_n, y_n)$, and, in a second field of view differing from the first field of view, the processing device determines transformed coordinates, $(x_1', y_1'), \ldots (x_n', y_n')$, for each of the vertices based upon changes in the field of view of the camera wherein the privacy mask and the transformed privacy mask obscure substantially common subject matter in both the first field of view and the second field of view respectively. Additionally, the privacy mask in the first field of view is definable by a plurality of pixel blocks and the processing device is configured to identify at least one location point for each of the pixel blocks, each of the location points defining one of the vertices of the privacy mask and wherein the privacy mask includes at least one non-perimeter pixel block entirely circumscribed by other pixel blocks forming a portion of the privacy mask.

The invention comprises, in another form thereof, a method of obscuring a selected portion of video images. The method includes acquiring images with a camera, displaying the acquired images on a display screen and defining a privacy mask with a plurality of mask vertices having coordinates $(x_1, y_1), \ldots (x_n, y_n)$, the privacy mask obscuring a selected portion of the displayed images. The method also includes adjusting the field of view of the camera from a first field of view to a second field of view, determining transformed coordinates, $(x_1', y_1'), \ldots (x_n', y_n')$, for each of the mask vertices to define a transformed privacy mask for the second field of view, the transformed coordinates being determined based upon changes in the field of view of the camera wherein the privacy mask and the transformed privacy mask obscure substantially common subject matter in both the first field of view and the second field of view respectively; and wherein the privacy map in the first field of view is definable by pixel rows and the step of defining the privacy mask with a plurality of mask vertices includes identifying opposing ends of a plurality of the pixel rows with each of the identified ends defining one of the mask vertices.

The invention comprises, in yet another form thereof, a method of obscuring a selected portion of video images. The method includes acquiring images with a camera, displaying the acquired images on a display screen and defining a privacy mask with a plurality of mask vertices having coordinates $(x_1, y_1), \ldots (x_n, y_n)$, the privacy mask obscuring a selected portion of the displayed images. The method also includes adjusting the field of view of the camera from a first field of view to a second field of view, determining transformed coordinates, $(x_1', y_1'), \ldots (x_n', y_n')$, for each of the mask vertices to define a transformed privacy mask for the second field of view, the transformed coordinates being determined based upon changes in the field of view of the camera wherein the privacy mask and the transformed privacy mask obscure substantially common subject matter in both the first field of view and the second field of view respectively; and wherein the privacy map in the first field of view is definable by a plurality of pixel blocks and the step of defining the privacy mask with a plurality of mask vertices includes identifying a location point for each of the pixel blocks, each of the location points defining one of the mask vertices and wherein at least one of the pixel blocks is a non-perimeter pixel block entirely circumscribed by other pixel blocks forming a portion of the privacy mask.

An advantage of the present invention is that it allows for a privacy mask that is finely tailored to the shape of the area for which privacy is desired.

Another advantage is that the present invention may also allow for a privacy mask in wihc there is an unmasked area which is entirely surrounded by a masked area, e.g., a donut-shaped mask.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
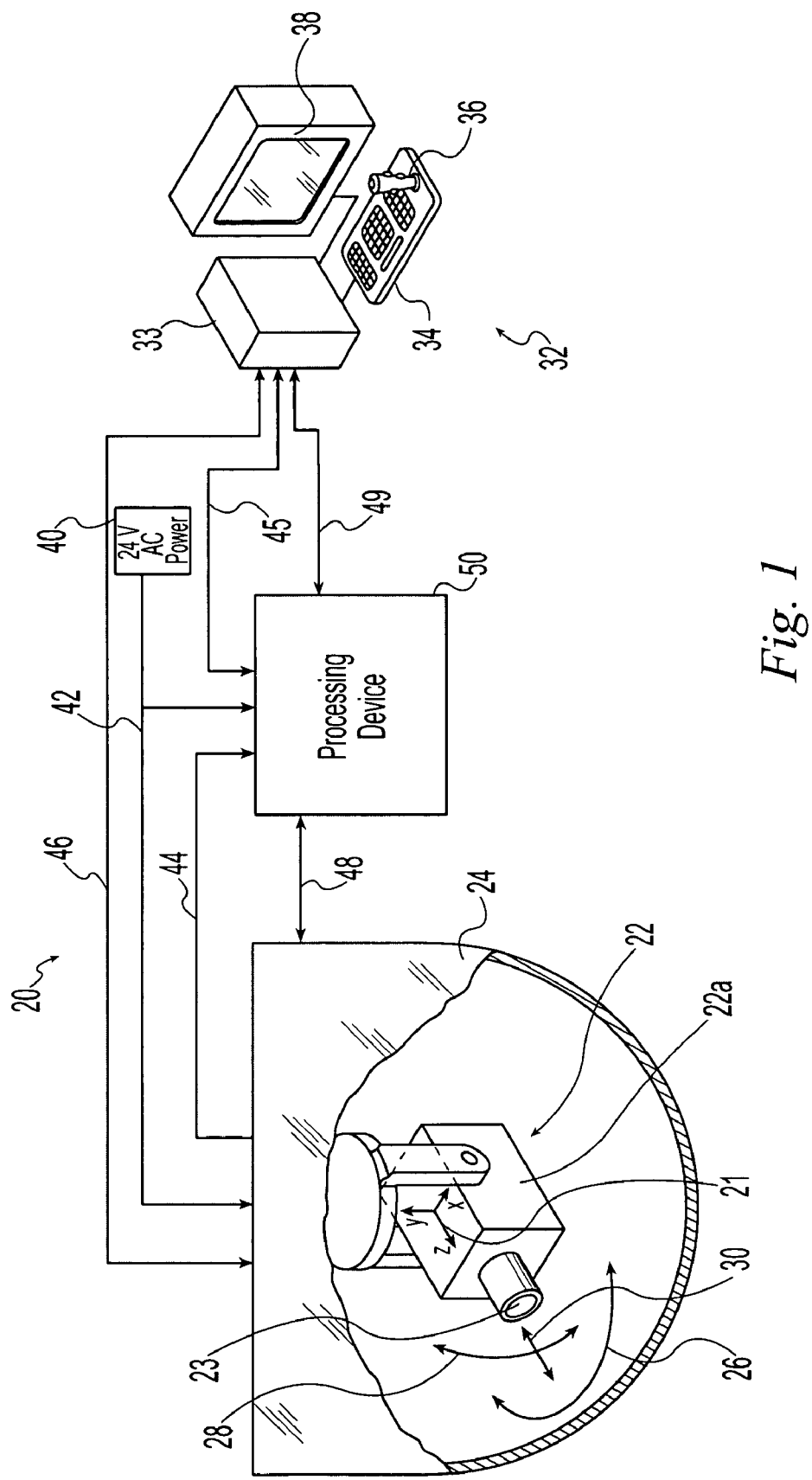
FIG. 1 is a schematic view of a video surveillance system in accordance with the present invention.

Corresponding reference characters indicate corresponding parts throughout the several views. Although the exemplification set out herein illustrates an embodiment of the invention, the embodiment disclosed below is not intended to be exhaustive or to be construed as limiting the scope of the invention to the precise form disclosed.

DESCRIPTION OF THE PRESENT INVENTION

In accordance with the present invention, a video surveillance system 20 is shown in FIG. 1. System 20 includes a camera 22 which is located within a partially spherical enclosure 24. Enclosure 24 is tinted to allow the camera to acquire images of the environment outside of enclosure 24 and simultaneously prevent individuals in the environment being observed by camera 22 from determining the orientation of camera 22. Camera 22 includes motors which provide for the panning, tilting and adjustment of the focal length of camera 22. Panning movement of camera 22 is represented by arrow 26, tilting movement of camera 22 is represented by arrow 28 and the changing of the focal length of the lens 23 of camera 22, i.e., zooming, is represented by arrow 30. As shown with reference to coordinate system 21, panning motion corresponds to movement along the x-axis, tilting motion corresponds to movement along the y-axis and focal length adjustment corresponds to movement along the z-axis. In the illustrated embodiment, camera 22 and enclosure 24 are a Phillips AutoDome® Camera Systems brand camera system, such as the G3 Basic AutoDome® camera and enclosure, which are available from Bosch Security Systems, Inc. formerly Phillips Communication, Security & Imaging, Inc. having a place of business in Lancaster, Pa. A camera suited for use with present invention is described by Sergeant et al. in U.S. Pat. No. 5,627,616 entitled Surveillance Camera System which is hereby incorporated herein by reference.

System 20 also includes a head end unit 32. Head end unit 32 may include a video switcher or a video multiplexer 33. For example, the head end unit may include an Allegiant brand video switcher available from Bosch Security Systems, Inc. formerly Phillips Communication, Security & Imaging, Inc. of Lancaster, Pa. such as a LTC 8500 Series Allegiant Video Switcher which provides inputs for up to 64 cameras and may also be provided with eight independent keyboards and eight monitors. Head end unit 32 includes a keyboard 34 and joystick 36 for operator or user input. Head end unit 32 also includes a display device in the form of a monitor 38 for viewing by the operator. A 24 volt a/c power source 40 is provided to power both camera 22 and a processing device 50 that is operably coupled to both camera 22 and head end unit 32.

Illustrated system 20 is a single camera application, however, the present invention may be used within a larger surveillance system having additional cameras which may be either stationary or moveable cameras or some combination thereof to provide coverage of a larger or more complex surveillance area. One or more VCRs or other form of analog or digital recording device may also be connected to head end unit 32 to provide for the recording of the video images captured by camera 22 and other cameras in the system.

Figure 2:
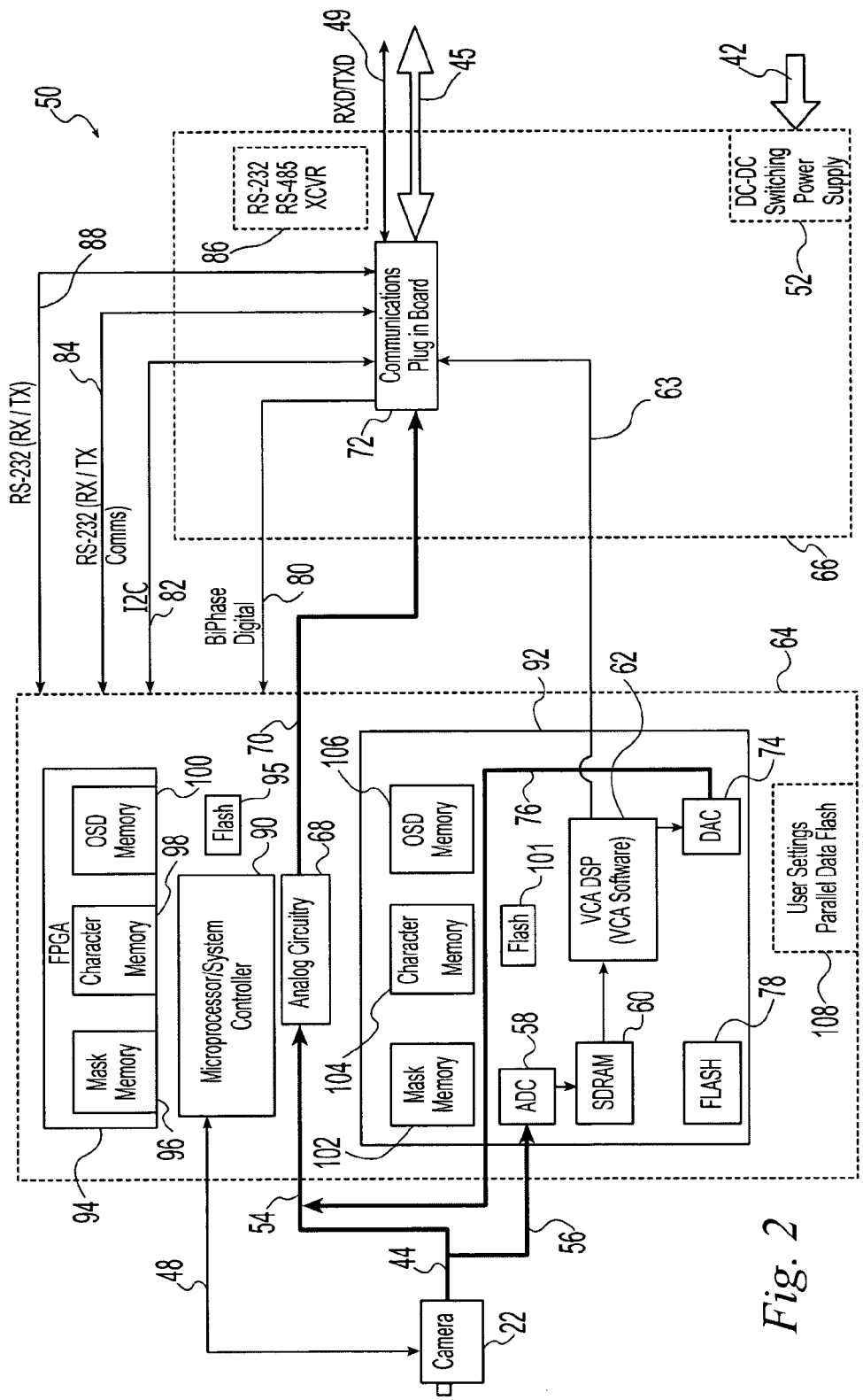
FIG. 2 is a schematic view of the processing device of FIG. 1.

The hardware architecture of processing device 50 is schematically represented in FIG. 2. In the illustrated embodiment, processing device 50 includes a system controller board 64. A power supply/IO section 66 of processing device 50 is illustrated as a separate board in FIG. 2, however, this is done for purposes of clarity and the components of power supply/IO section 66 would be directly mounted to system controller board 64. A power line 42 connects power source 40 to converter 52 in order to provide power to processing device 50. Processing device 50 receives a raw analog video feed from camera 22 via video line 44, and video line 45 is used to communicate video images to head end unit 32. In the illustrated embodiment, video lines 44, 45 are coaxial, 75 ohm, 1 Vp-p and include BNC connectors for engagement with processing device 50. The video images provided by camera 22 can be analog and may conform to either NTSC or PAL standards. Board 72 can be a standard communications board capable of handling biphase signals and including a coaxial message integrated circuit (COMIC) for allowing two-way communication over video links.

Via another analog video line 56, an analog to digital converter 58 receives video images from camera 22 and converts the analog video signal to a digital video signal. After the digital video signal is stored in a buffer in the form of SDRAM 60, the digitized video images are passed to video content analysis digital signal processor (VCA DSP) 62. A video stabilization algorithm is performed in VCA DSP 62. The adjusted display image is sent to digital to analog converter 74 where the video signal is converted to an analog signal. The resulting annotated analog video signal is sent via analog video lines 76, 54, analog circuitry 68 and analog video line 70 to communications plug-in board 72, which then sends the signal to head end unit 32 via video line 45.

Processor 62 may be a TIDM 642 multimedia digital signal processor available from Texas Instruments Incorporated of Dallas, Tex. At start up, the programmable media processor 62 loads a bootloader program. The boot program then copies the VCA application code from a memory device such as flash memory 78 to SDRAM 60 for execution. In the illustrated embodiment, flash memory 78 provides 4 megabytes of memory and SDRAM 60 provides 32 megabytes of memory.

Since the application code from flash memory 78 is loaded on SDRAM 60 upon start up, SDRAM 60 is left with approximately 28 megabytes of memory for video frame storage and other software applications.

In the embodiment shown in FIG. 2, components located on system controller board 64 are connected to communications plug-in board 72 via a high speed serial communications bus 63, biphase digital data bus 80, an I2C data bus 82, and RS-232 data buses 84, 88. An RS-232/RS-485 compatible transceiver 86 may also be provided for communication purposes. Coaxial line 45 provides communication between processing device 50 and head end unit 32 via communications plug in board 72. Various additional lines, such as line 49, which can be in the form of an RS-232 debug data bus, may also be used to communicate signals from head end unit 32 to processing device 50. The signals communicated by these lines, e.g., lines 45 and 49, can include signals that can be modified by processing device 50 before being sent to camera 22. Such signals may be sent to camera 22 via line 48 in communication with a microcontroller 90. In the illustrated embodiment, microcontroller 90 is a H8S/2378 controller commercially available from Renesas Technology America, Inc. having a place of business in San Jose, Calif.

Microcontroller 90 operates system controller software and is also in communication with VCA components 92. Although not shown, conductive traces and through-hole vias lined with conductive material are used provide electrical communication between the various components mounted on the printed circuit boards depicted in FIG. 2. Thus, VCA components such as VCA DSP 62 can send signals to camera 22 via microcontroller 90 and line 48. It is also possible for line 46 to be used to communicate signals directly to camera 22 from head end unit 32 without communicating the signals through processing device 50. Various alternative communication links between processing device 50 and camera 22 and head unit 32 could also be employed with the present invention.

System controller board 64 also includes a field programmable gate array (FPGA) 94 including three memory devices, i.e., a mask memory 96, a character memory 98, and an on-screen display (OSD) memory 100. In the illustrated embodiment, FPGA 94 may be a FPGA commercially available from Xilinx, Inc. having a place of business in San Jose, Calif. and sold under the name Spartan 3. In the illustrated embodiment, mask memory 96 is a 4096×16 dual port random access memory module, character memory 98 is a 4096× 16 dual port random access memory module and OSD memory 100 is a 1024×16 dual port random access memory module. Similarly, VCA components 92 includes a mask memory 102, a character memory 104, and an on-screen display (OSD) memory 106 which may also be dual port random access memory modules. These components may be used to mask various portions of the image displayed on-screen 38 or to generate textual displays for screen 38. More specifically, this configuration of processing device 50 enables the processor to apply privacy masks and on-screen displays to either an analog video signal or a digital video signal.

If it is desired to apply the privacy masks and on-screen displays to a digital image signal, memories 102, 104 and 106 would be used and the processing necessary to calculate the position of the privacy masks and on-screen displays would take place in processor 62. If the privacy masks and on-screen displays are to be applied to an analog video signal, memories 96, 98, and 100 would be used and the processing necessary calculate the position of the privacy masks and on-screen displays would take place in microprocessor 90. The inclusion of VCA components 92, including memories 102, 104, 106 and processor 62, in processing device 50 facilitates video content analysis, such as for the automated tracking of intruders. Alternative embodiments of processing device 50 which do not provide the same video content analysis capability, however, may be provided without VCA components 92 to thereby reduce costs. In such an embodiment, processing device 50 would still be capable of applying privacy masks and on-screen displays to an analog video signal through the use of microprocessor 90 and field programmable arrray (FPGA) 94 with its memories 96, 98, and 100.

Processing device 50 also includes rewritable flash memory devices 95, 101. Flash memory 95 is used to store data including character maps that are written to memories 98 and 100 upon startup of the system. Similarly flash memory 101 is used to store data including character maps that are written to memories 104 and 106 upon startup of the system. By storing the character map on a rewritable memory device, e.g., either flash memory 95, 101, instead of a read-only memory, the character map may be relatively easily upgraded at a later date if desired by simply overwriting or supplementing the character map stored on the flash memory. System controller board 64 also includes a parallel data flash memory 108 for storage of user settings including user-defined privacy masks wherein data corresponding to the user-defined privacy masks may be written to memories 96 and/or 102 upon startup of the system.

Figure 3:
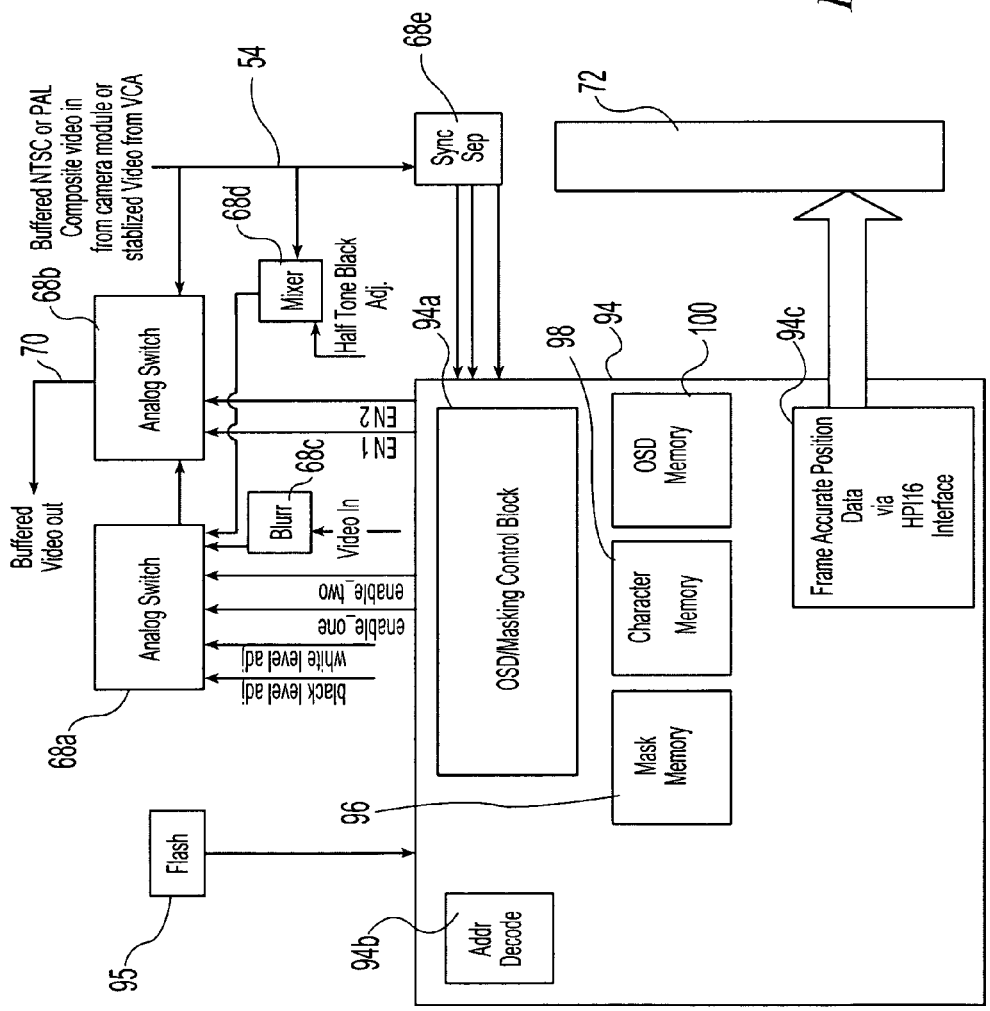
FIG. 3 is a schematic view of a portion of the processing device which may be used with an analog video signal.

FIG. 3 provides a more detailed schematic illustration of FPGA 94 and analog circuitry 68 than that shown in FIG. 2. As seen in FIG. 3, in addition to mask memory 96, character memory 98 and OSD memory 100, FPGA 94 also includes an OSD/Masking control block 94a, an address decoder 94b, and an optional HPI16 interface 94c for communicating frame accurate position data. The HPI16 interface is used when the privacy mask and informational displays, e.g., individual text characters, are to be merged with a digital video image using VCA components 92.

As also seen in FIG. 3, analog circuitry (shown in a more simplified manner and labeled 68 in FIG. 2) includes a first analog switch 68a, a second analog switch 68b, a filter 68c, an analog multiplexer 68d, and a video sync separator 68e. A "clean" analog video signal, i.e., although the image may be stabilized, the video signal includes substantially all of the image captured by camera 22 without any substantive modification to the content of the image, is conveyed by line 54 to the second analog switch 68b, mixer 68c and sync separator 68e. An analog video signal is conveyed from mixer 68c to first analog switch 68a. Mixer 68c also includes a half tone black adjustment whereby portions of the video signal may be modified with a grey tone. Sync separator 68e extracts timing information from the video signal which is then communicated to FPGA 94. A clean analog video signal, such as from FPGA 94 or line 54, is also received by filter 68c. Passing the analog video signal through filter 68c blurs the image and the blurred image is communicated to analog switch 68a. Analog switch 68a also has input lines which correspond to black and white inputs. Two enable lines provide communication between analog switch 68a and FPGA 94. The two enable lines allow FPGA 94 to control which input signal received by analog switch 68a is output to analog switch 68b. As can also be seen in FIG. 3, second analog switch 68b includes two input lines, one corresponding to a "clean" analog video signal from line 54 and the output of analog switch 68a. Two enable lines provide communication between analog switch 68b and FPGA 94 whereby FPGA 94 controls which signal input into analog switch 68b is output to line 70 and subsequently displayed on display screen 38.

Each individual image, or frame, of the video sequence captured by camera 22 is comprised of pixels arranged in a series of rows and the individual pixels of each image are serially communicated through analog circuitry 68 to display screen 38. When analog switch 68b communicates clean video signals to line 70 from line 54, the pixels generated from such a signal will generate on display screen 38 a clear and accurate depiction of a corresponding portion of the image captured by camera 22. To blur a portion of the image displayed on-screen 38 (and thereby generate a privacy mask), analog switch 68a communicates a blurred image signal, corresponding to the signal received from filter 68c, to analog switch 68b and switch 68b communicates this blurred image to line 70 for the pixels used to generate the selected portion of the image that corresponds to the privacy mask. If a grey tone privacy mask is desired, the input signal from mixer 68d (instead of the blurred image signal from filter 68c) can be communicated through switches 68a and 68b and line 70 to display screen 38 for the selected portion of the image. To generate on-screen displays, e.g., black text on a white background, analog switch 68a communicates the appropriate signal, either black or white, for individual pixels to generate the desired text and background to analog switch 68b which then communicates the signal to display screen 38 through line 70 for the appropriate pixels. Thus, by controlling switches 68a and 68b, FPGA 94 generates privacy masks and informational displays on display screen 38 in a manner that can be used with an analog video signal. In other words, pixels corresponding to privacy masks or informational displays are merged with the image captured by camera 22 by the action of switches 68a and 68b.

As described above, a character map is stored in memory 98 and may be used in the generation of the informational displays. These individual character maps each correspond to a block of pixels and describe which of the pixels in the block are the background and which of the pixels are the foreground wherein the background and foreground have different display characteristics, e.g., the foreground and background being black and white or some other pair of contrasting colors, to form the desired character. These individual character maps may then be used to control switches 68a, 68b to produce the desired block of pixels on display screen 38.

The privacy mask is rendered in individual blocks of pixels that are 4×4 pixels in size and the implementation of the privacy mask can be described generally as follows. Initially, the user defines the boundaries of the privacy mask. When the field of view of camera 22 changes, new transformed boundaries for the privacy mask that correspond to the new field of view are calculated. The privacy mask area defined by the new boundaries is then rendered, or infilled, using 4×4 pixel blocks. By using relatively small pixel blocks, i.e., 4×4 pixel blocks instead of 10×16 pixel blocks (as might be used when displaying an individual text character), to completely fill the new transformed boundaries of the privacy mask, the privacy mask will more closely conform to the actual subject matter for which privacy masking is desired as the field of view of the camera changes. The use of privacy masking together with the on-screen display of textual information is described by Henninger in a U.S. patent application entitled ON-SCREEN DISPLAY AND PRIVACY MASKING APPARATUS AND METHOD filed on the same date as the present application and having a common assignee with the present application, the disclosure of which is hereby incorporated herein by reference.

This rendering of the privacy mask in 4×4 pixel blocks does not require that the privacy mask boundaries be defined in any particular manner and the mask may be rendered at this resolution regardless of the precision at which the mask is initially defined. The process of defining and transforming a privacy mask is described in greater detail below.

In the illustrated embodiment, commands may be input by a human operator at head end unit 32 and conveyed to processing device 50 via one of the various lines, e.g., lines 45, 49, providing communication between head end unit 32 and processing device 50 which also convey other serial communications between head end unit 32 and processing device 50. In the illustrated embodiment, processing device 50 is provided with a sheet metal housing and mounted proximate camera 22. Processing device 50 may also be mounted employing alternative methods and at alternative locations. Alternative hardware architecture may also be employed with processing device 50. It is also noted that by providing processing device 50 with a sheet metal housing its mounting on or near a PTZ (pan, tilt, zoom) camera is facilitated and system 20 may thereby provide a stand alone embedded platform which does not require a personal computer-based system.

The provision of a stand-alone platform as exemplified by processing device 50 also allows the present invention to be utilized with a video camera that outputs unaltered video images, i.e., a "clean" video signal that has not been modified. After being output from the camera assembly, i.e., those components of the system within camera housing 22a, the "clean" video may then have a privacy mask and on-screen displays applied to it by the stand-alone platform. Typically, the use of privacy masking precludes the simultaneous use of automated tracking because the application of the privacy mask to the video image, oftentimes done by a processing device located within the camera housing, obscures a portion of the video image and thereby limits the effectiveness of the video content analysis necessary to perform automated tracking. The use of a stand-alone platform to apply privacy masking and on-screen informational displays to clean video images output by a camera allows for the use of automated tracking, or other applications requiring video content analysis, without requiring the camera assembly itself to include the hardware necessary to perform all of these features. If it was desirable, however, processing device 50 could also be mounted within housing 22a of the camera assembly.

Processing device 50 can perform several functions in addition to the provision of privacy masking and on-screen displays. One such function may be an automated tracking function. For example, processing device 50 may identify moving target objects in the field of view (FOV) of the camera and then generate control signals which adjust the pan, tilt and zoom settings of the camera to track the target object and maintain the target object within the FOV of the camera. An example of an automated tracking system that may be employed by system 20 is described by Sablak et al. in U.S. patent application Ser. No. 10/306,509 filed on Nov. 27, 2002 entitled "VIDEO TRACKING SYSTEM AND METHOD" the disclosure of which is hereby incorporated herein by reference.

As mentioned above, processing device 50 also runs software which enables a user to identify private areas, such as the window of a nearby residence for masking. The privacy mask is then used to obscure the underlying subject matter depicted in the image. For cameras having an adjustable field of view, the masked area must be transformed as the field of view of the camera is changed if the mask is to continue to provide privacy for the same subject matter, e.g., a window of a nearby residence, as the field of view of the camera is changed. Although such privacy masks typically involve the obscuration of the displayed image within the area of the mask, it may alternatively be desirable to provide a virtual privacy mask. For example, a window or other area may include a significant amount of motion that it is not desirable to track but which could activate an automated tracking program. In such a situation, it may be desirable to define a mask for such an area and continue to display the masked area at the same resolution as the rest of the image on display screen 38 but not utilize this area of the image for automated tracking purposes. In other words, for purposes of the automated tracking program the image is "obscured" within the masked area (by reducing the information provided or available for analysis for the masked area) even though the resolution of the image displayed in this area is not reduced. The present invention may also be used with such virtual privacy masks.

Although a specific hardware configuration is discussed above, various modifications may be made to this configuration in carrying out the present invention. In such alternative configurations it is desirable that the update rate of masking is sufficient to prevent the unmasking of the defined mask area during movement of the camera. The method of identifying a masked area and transforming the masked area as the field of view of the camera is changed will now be described.

Figure 4:
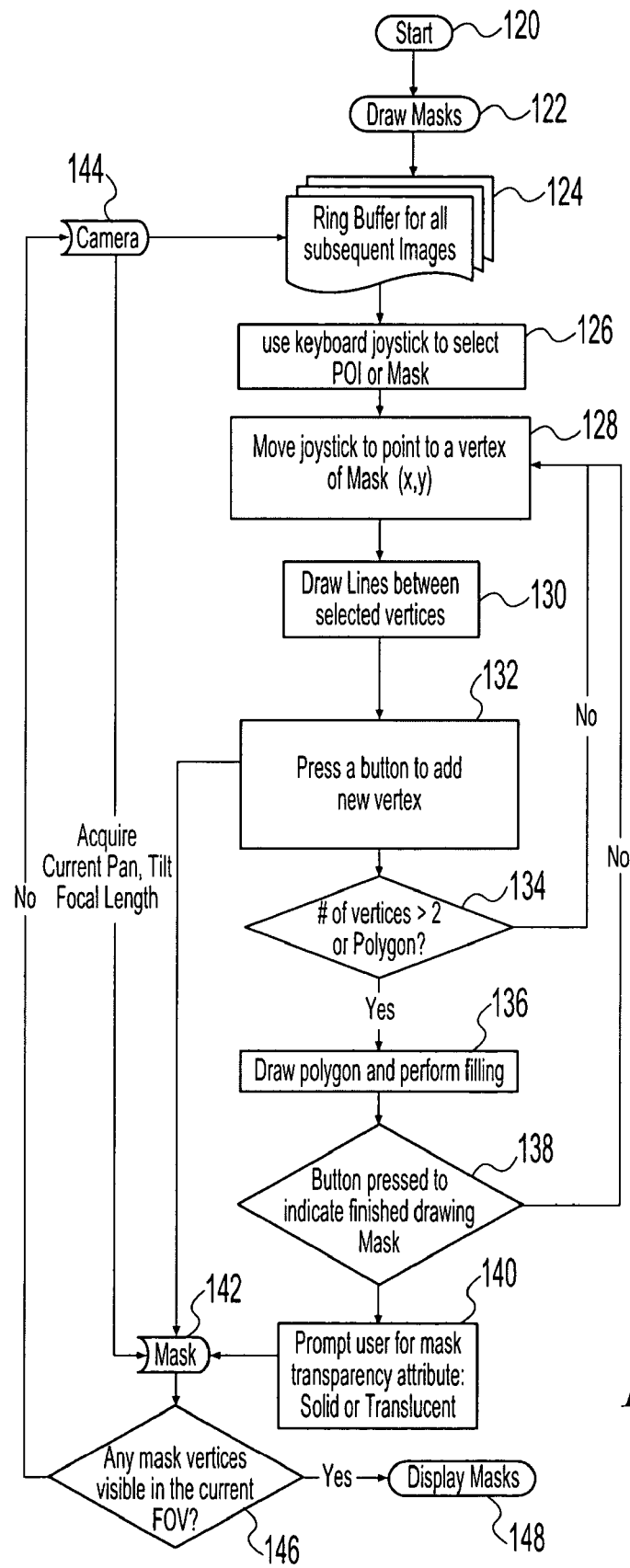
FIG. 4 is a flow chart illustrating a method by which a privacy mask may be defined.
Figure 5:
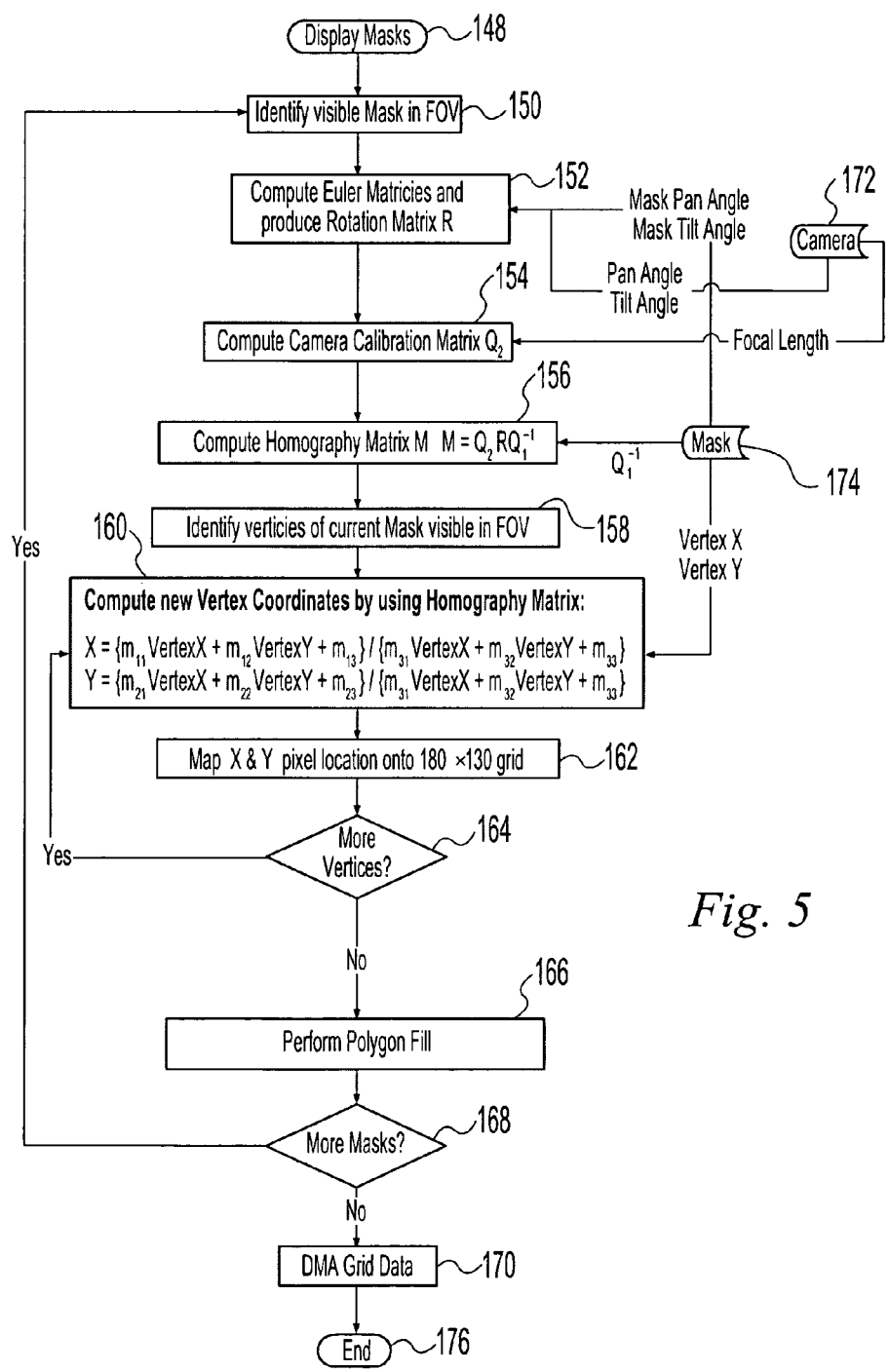
FIG. 5 is a flow chart illustrating a method by which a privacy mask may be displayed on a display screen.

FIGS. 4 and 5 present flowcharts that illustrate the method by which the software running on processing device 50 provides transformable privacy masks. FIG. 4 illustrates the algorithm by which a privacy mask is created by a user of the system. First, the user initiates the draw mask function by selecting this function from an interactive menu or by another suitable means as indicated at 120, 122. As the draw mask function is initiated, the most recently acquired images are continuously stored by the processing device as indicated at 124. The user first directs the software that a privacy mask will be drawn instead of selecting a point of interest (POI) as indicated at 126. A POI may be selected when employing a video tracking program to track the POI. The user then manipulates joystick 36 to select a mask vertex (x, y) as indicated at 128. A mouse or other suitable means may also be used to select a mask vertex. If more than one mask vertex has been selected, lines connecting the mask vertices are then drawn on the screen as indicated at 130. The user then confirms the selection of the new mask vertex by pushing a particular button or key on joystick 36 or keyboard 34 as indicated at 132. The addition of the new vertex to the mask is indicated by the line leading from box 132 to box 142. The program then determines whether the number of vertices selected for the mask is greater than 2 and whether or not the selected vertices define a polygon as indicated at 134. If the answer to either of these questions is No the program returns to box 128 for the selection of a new mask vertex. If at least three vertices have been chosen and the selected vertices define a polygon, the program draws and fills the mask defined by the vertices as indicated at 136. The user is then asked if the mask is complete or another vertex should be added. If the user indicates that another vertex is to be added to the mask, the program returns to box 128 and the process described above is repeated. If the user has finished adding vertices to the mask and indicates that the mask is complete, the program proceeds to box 140 where the user is asked to select the type of obscuring infill to be used with the mask.

In the illustrated embodiment, the user may select either a solid infill or a translucent infill. A solid mask infill may take the form of a solid color infill, such as a homogenous gray or white infill, that obscures the video image within the mask by completely blocking that portion of the video image which corresponds to the privacy mask. A translucent infill may be formed by reducing the resolution of the video image contained within the privacy mask area to thereby obscure the video image within the privacy mask without blocking the entirety of the video image within the mask. For example, for a digital video signal, the area within the privacy mask may be broken down into blocks containing a number of individual pixels. The values of the individual pixels comprising each block are then averaged and that average value is used to color the entire block. For an analog video signal, the signal corresponding to the area within the mask may be filtered to provide a reduced resolution. These methods of reducing the resolution of a selected portion of a video image are well known to those having ordinary skill in the art.

These methods of obscuring the image may be desirable in some situations where it is preferable to reduce the resolution of the video image within the privacy mask without entirely blocking that portion of the image. For example, if there is a window for which privacy mask is desired and there is also a walkway in front of that window for which surveillance is desired, by using a translucent privacy mask, the details of the image corresponding to the window may be sufficiently obscured by the reduction in resolution to provide the desired privacy while still allowing security personnel to follow the general path of movement of a target object or individual that moves or walks in front of the window.

After selecting the type of infill for the mask, the program records this data together with the mask vertices as indicated at box 142. When initially recording the mask vertices, the pan, tilt and zoom settings of the camera are also recorded with the vertex coordinates as indicated by the line extending from camera box 144 to mask box 142. After the mask has been defined, the program determines whether any of the mask vertices are in the current field of view of the camera as indicated at 146. If no mask vertices are in the current field of view, the camera continues to forward acquired images to the processing device 50 and the images are displayed on display screen 38 without a privacy mask. If there are privacy mask vertices contained within the current field of view of the camera, the program proceeds to display the mask on display screen 38 as indicated by box 148.

FIG. 5 provides a flowchart indicating the method by which privacy masks are displayed on display screen 38 during normal operation of the surveillance camera system 20. The program first determines whether there are any privacy masks that are visible in the current field of view of the camera as indicated at 150. This may be done by using the current pan, tilt and zoom settings of the camera to determine the scope of the current field of view and comparing current field of view with the vertices of the privacy masks that have been defined by the user.

If there is a mask present in the current field of view, the program proceeds to box 152 wherein it obtains the mask data and the current pan and tilt position of the camera. The mask data includes the pan and tilt settings of the camera corresponding to the original mask vertices. The Euler angles and a Rotation matrix are then computed as described below. (As is well known to those having ordinary skill in the art, Euler's rotation theorem posits that any rotation can be described with three angles.) The focal length, or zoom, setting of the camera is then used in the computation of the camera calibration matrix $Q_2$ as indicated at 154. Homography matrix M is then computed as indicated at 156.

The calculation of the Rotational and homography matrices is used to transform the privacy mask to align it with the current image and may require the translation, scaling and rotation of the mask. Transformation of the mask for an image acquired at a different focal length than the focal length at which the mask was defined requires scaling and rotation of the mask as well as translation of the mask to properly position the mask in the current image. Masks produced by such geometric operations are approximations of the original. The mapping of the original, or reference, mask onto the current image is defined by:

$$p' = sQRQ^{-1}p = Mp \quad (1)$$

where p and p' denote the homographic image coordinates of the same world point in the first and second images, s denotes the scale image (which corresponds to the focal length of the camera), Q is the internal camera calibration matrix, and R is the rotation matrix between the two camera locations.

Alternatively, the relationship between the mask projection coordinates p and p', i.e., pixel locations (x,y) and (x', y'), of a stationary world point in two consecutive images may be written as:

$$x' = \frac{m_{11}x + m_{12}y + m_{13}}{m_{31}x + m_{32}y + m_{33}} \quad (2)$$

$$y' = \frac{m_{21}x + m_{22}y + m_{23}}{m_{31}x + m_{32}y + m_{33}} \quad (3)$$

Where $\lfloor m_{ij} \rfloor_{3 \times 3}$ is the homography matrix M that maps (aligns) the first set of coordinates to the second set of coordinates.

The main task in such image/coordinate alignment is to determine the matrix M. From equation (1), it is clear that given s, Q and R it is theoretically straightforward to determine matrix M. In practice, however, the exact values of s, Q, and R are often not known. Equation (1) also assumes that the camera center and the center of rotation are identical, which is typically only approximately true, however, this assumption may be sufficiently accurate for purposes of providing privacy masking. In the illustrated embodiment, camera 22 provides data, i.e., pan and tilt values for determining R and zoom values for determining s, on an image synchronized basis and with each image it communicates to processing device 50.

With this image specific data, the translation, rotation, and scaling of the privacy mask to properly align it for use with a second image can then be performed using the homographic method outlined above. In this method, a translation is a pixel motion in the x or y direction by some number of pixels. Positive translations are in the direction of increasing row or column index: negative ones are the opposite. A translation in the positive direction adds rows or columns to the top or left to the image until the required increase has been achieved. Image rotation is performed relative to an origin, defined to be at the center of the motion and specified as an angle. Scaling an image means making it bigger or smaller by a specified factor. The following approximations may be used to represent such translation, rotation and scaling:

$$x' = s(x \cos \alpha - y \sin \alpha) + t_x$$

$$y' = s(y \sin \alpha + x \cos \alpha) + t_y \quad (4)$$

wherein
s is the scaling (zooming) factor.
α is the angle of rotation about the origin;
$t_x$ is the translation in the x direction; and
$t_y$ is the translation in the y direction.
By introducing new independent variables $a_1 = s \cos \alpha$ and $a_2 = s \sin \alpha$, equation (4) becomes:

$$x' = a_1 x - a_2 y + t_x$$

$$y' = a_2 x + a_1 y + t_y \quad (5)$$

After determining $a_1$, $a_2$, $t_x$ and $t_y$, the coordinates of the reference mask vertices can be transformed for use with the current image.

The value of $Q_1^{-1}$, corresponding to the mask being transformed is obtained from a storage device as indicated by the line extending from box 174 to box 156. E.g., this mask data may be stored in mask memory. As described above, when the mask is to be applied to a digital video image, the data will be stored in mask memory 102 and when the mask is to be applied to an analog video signal the data will be stored in mask memory 94. After computation of the homography matrix M, the vertices of the current mask visible in the field of view are identified, as indicated at 158, and then the homography matrix is used to determine the transformed image coordinates of the mask vertices as indicated at 160. The new image coordinates are then mapped onto a 180×360 grid as indicated at 162 and stored in the appropriate mask memory 96 or 102.

After mapping the mask vertex, the program determines if there are any remaining mask vertices that require transformation as indicated at 164. If there are additional mask vertices, the program returns to box 160 where the homography matrix M is used to determine the transformed image coordinates of the additional mask vertex. This process is repeated until transformed image coordinates have been computed for all of the mask vertices. The process then proceeds to box 166 and the polygon defined by the transformed image coordinates is infilled.

The program then determines if there are any additional privacy masks contained in the current field of view as indicated at 168. If there are additional masks, the program returns to box 150 where the additional mask is identified and the process described above is repeated for this additional mask. Once all of the masks have been identified, transformed and infilled, the program proceeds to box 170 where the mask data stored in mask memory, 96 or 102, is retrieved using DMA (direct memory access) techniques for application to the video image signal. The displaying of the privacy masks for the current field of view is then complete as exemplified by box 176.

So long as the field of view of the camera is not changed, the image coordinates of the privacy masks remain constant. If the mask infill is a solid infill, the solid infill remains unchanged until the field of view of the camera changes. If the mask infill is a translucent infill, the relatively large pixel blocks infilling the mask will be updated with each new image acquired by the camera but the location of the pixel blocks forming the privacy mask will remain unchanged until the field of view of the camera is changed. Once the field of view of the camera is changed, by altering one or more of the pan angle, tilt angle or zoom setting (i.e., focal length) of the camera, the display mask algorithm illustrated in FIG. 4 is repeated to determine if any privacy masks are contained in the new field of view and to transform the image coordinates of any masks contained within the field of view so that the masks can be displayed on display screen 38.

Figure 6:
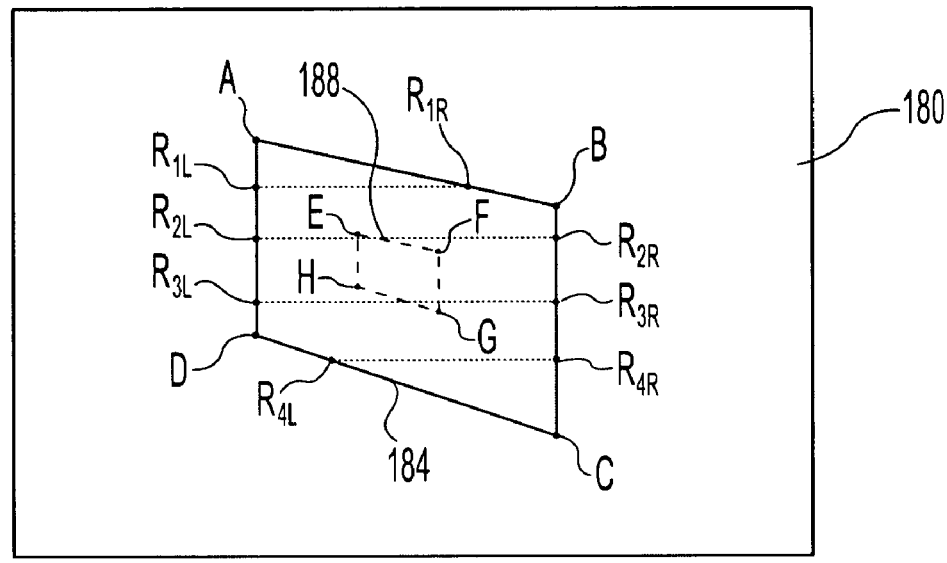
FIG. 6 is a schematic view of a privacy mask.
Figure 7:
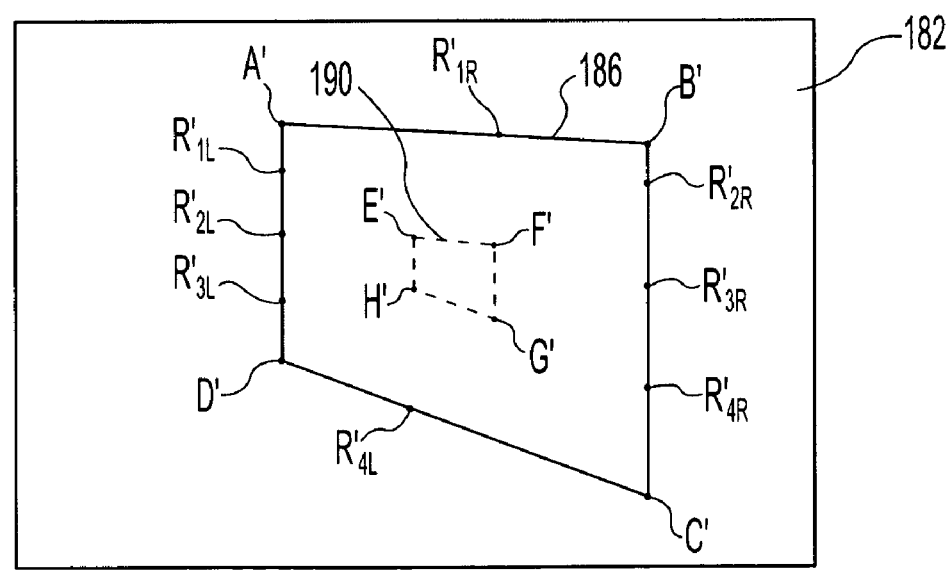
FIG. 7 is a schematic view of the privacy mask of FIG. 6 after the mask has been transformed to account for a change in the field of view of the camera.

The definition of the privacy mask vertices may be done in alternative manners as described below with reference to FIGS. 6-9. For example, the original definition of the privacy mask involves the user selecting a number of particular points, e.g., points A, B, C and D in FIG. 6, with the camera defining a first field of view to define a polygon that corresponds to the boundary of the privacy mask. With reference to FIGS. 6 and 7, FIG. 6 shows the image 180 that is displayed on screen 38 when camera 22 defines a first field of view while FIG. 7 shows the image 182 that is displayed on screen 38 after slightly adjusting the field of view of the camera to define a second field of view. Line 184 defines the outer boundary of the privacy mask in image 180 while line 186 defines the outer boundary of the transformed privacy mask in image 182.

The vertices used to define the privacy mask may be limited to the user input vertices, i.e., points A, B, C and D for the mask of FIGS. 6 and 7, or, after the user has defined the boundaries of the mask by inputting vertices, additional points along the boundary of the mask may be automatically selected to define further vertices of the mask. For example, the mask defined by the user can be broken down into the individual rows of pixels defining the mask and the pixel at the left and right ends of each row included in the original mask may be selected as additional mask vertices. Alternatively, instead of selecting additional vertices for each row, additional vertices may be selected for every second row or for every third row, etc. In FIG. 6, only a few additional vertices are labeled for illustrative purposes. (FIG. 6 is not drawn to scale and vertices have not been drawn for all the pixel rows forming the mask.) More specifically, vertices $R_{1L}$, $R_{1R}$ respectively correspond to the left and right end points of the first row of pixels in the mask, while vertices $R_{2L}$, $R_{2R}$ respectively correspond to the left and right end points of the second row of pixels in the mask, the remaining vertices are labeled using this same nomenclature.

After adjusting the field of view of the camera to second field of view as depicted in FIG. 7, the coordinates of the mask vertices are transformed and the transformed coordinates are used to define vertices which, when connected, define the boundary 186 of the transformed mask for display on screen 38. If only the user defined points are used to define the mask vertices, the transformed mask will be drawn by connecting vertices A, B, C and D. However, if additional vertices, e.g., $R_{1L}$, $R_{1R}$ ... $R_{4L}$, $R_{4R}$ etc., are used to define the mask, then transformed coordinates will be calculated for each of these vertices and the transformed mask will be drawn by connecting each of the transformed vertices. After defining the boundaries of the mask, the mask is then infilled. By providing a larger number of vertices, the mask will more closely follow the contours of the subject matter obscured by the originally defined privacy mask as the field of view changes. The degree to which the mask conforms to the contours of the subject matter for which masking is desired is also influenced by the manner in which the boundaries of the mask are infilled. For example, infilling the privacy mask on an individual pixel basis, the displayed mask will most closely correspond to the calculated boundaries of the privacy mask. The mask may also be infilled in small blocks of pixels, for example, individual blocks having a size of 4×4 pixels may be used to infill the mask, because these individual blocks of pixels are larger than a single pixel, the resulting display will not as closely correspond to calculated boundaries of the privacy mask as when the mask is infilled on an individual pixel basis but will still provide a relatively precisely rendered privacy mask.

The present invention may also be used to allow for an interior area within a mask that is not obscured. For example, the area defined by vertices E, F, G and H in FIG. 6 is an unmasked area, i.e., this portion of the video image is not obscured, that is completely encircled by a masked area. This unmasked area would be defined by the user when originally inputting the mask. For example, the software could inquire whether the user wanted to create an interior unmasked area prior when the mask is being defined. The vertices defining the unmasked interior portion, i.e., the interior boundary 188 of the mask, would be transformed, with transformed vertices E', F', G' and H' defining a transformed inner boundary 190, in the same manner as the outer boundary of the mask is transformed. Additional vertices, for each pixel row, could also be defined by for this interior boundary in the same manner as the outer mask boundary.

Figure 8:
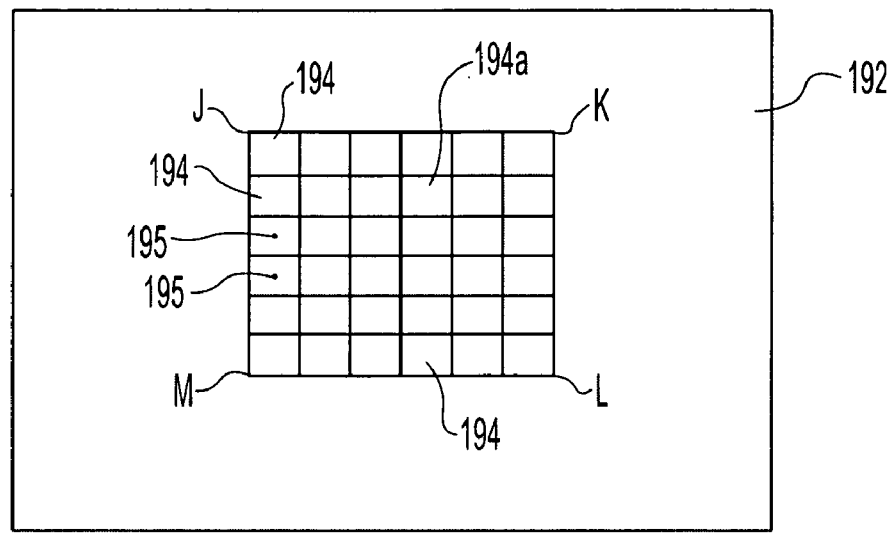
FIG. 8 is a schematic view of another privacy mask.
Figure 9:
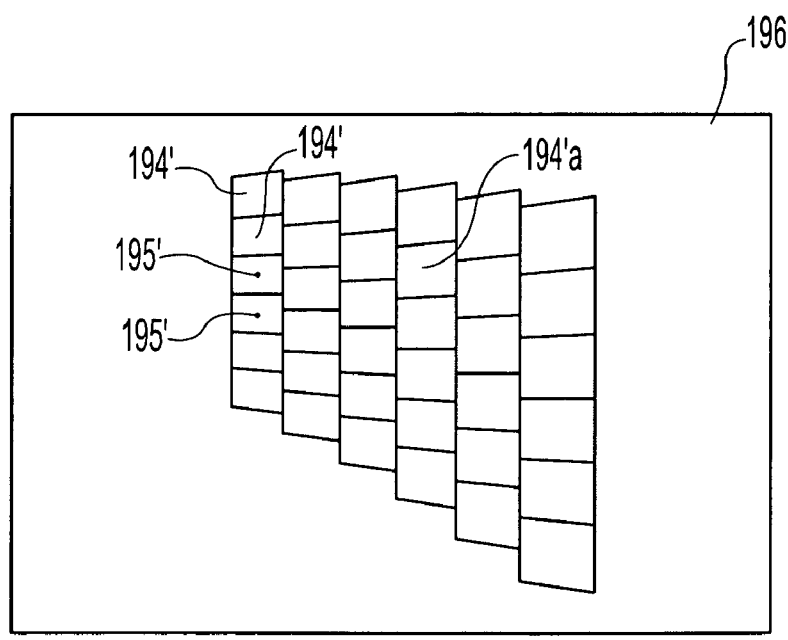
FIG. 9 is a schematic view of the privacy mask of FIG. 8 after the mask has been transformed to account for a change in the field of view of the camera.

An alternative method of defining the mask vertices is illustrated in FIGS. 8 and 9. In this embodiment of the invention, the user inputs a series of points to define the original mask, e.g., points J, K, L and M in image 192 of FIG. 8. The masked area is then broken down into individual blocks of pixels 194 having a common size. These individual mask blocks may any number of pixels, e.g., blocks of 9 or 4 pixels. Blocks 194 may also consist of only a single pixel. The smaller the number of pixels in each block, the more closely the transformed mask will correspond to the actual subject matter obscured by the original mask. As can be seen in FIG. 8 some of the mask blocks, e.g., block 194a, may be non-perimeter pixel blocks that are entirely circumscribed by other blocks that form a portion of the mask. As each of the individual blocks are defined, a mask vertex 195 is assigned to each block. The coordinates of each vertex may correspond to the center of the block, as shown in FIG. 8, or another common location, e.g., the upper left hand corner of each block. When the field of view of the camera is changed, e.g., to the second field of view defining image 196 shown in FIG. 9, transformed coordinates are calculated for each of the individual vertices 195 defining the locations of the mask blocks 194. A transformed size for each of the mask blocks is also calculated. Thus, mask blocks that were the same size in the field of view when the mask was originally defined may have different sizes when the field of view of the camera is changed. The transformed coordinates and size of each mask block forming the mask is calculated and used to define the transformed mask as exemplified in FIG. 9. The boundaries defined by the transformed mask are then used to determine the area of the image that requires infilling to produce the desired obscuration. It would also be possible for the mask blocks 194 to completely encircle an unmasked area within the interior of the mask.

While this invention has been described as having an exemplary design, the present invention may be further modified within the spirit and scope of this disclosure. This application is therefore intended to cover any variations, uses, or adaptations of the invention using its general principles.

What is claimed is:

1. A surveillance camera system comprising:
   a camera having an adjustable field of view;
   a display screen displaying images acquired by said camera;
   a processing device operably coupled to said camera and said display screen, said processing device configured to allow a user to define a privacy mask obscuring a portion of the displayed images, said processing device further configured to transform said privacy mask in accordance with changes in the field of view of said camera, wherein, in a first field of view, said privacy mask is defined by a plurality of vertices having coordinates (x1, y1), ... (xn, yn), and, in a second field of view differing from said first field of view, said processing device determines transformed coordinates, (x1', y1'), ... (xn', yn'), for each of said vertices based upon changes in the field of view of said camera wherein said privacy mask and said transformed privacy mask obscure substantially common subject matter in both said first field of view and said second field of view respectively; and
   wherein said privacy mask in said first field of view is definable by pixel rows and said processing device is configured to identify opposing ends of a plurality of said pixel rows, each of said identified ends defining one of said vertices of said privacy mask, and wherein said processing device is programmed to determine a polygon defined by said vertices of said privacy mask and to infill said polygon to form said privacy mask without scanning an entire displayed image.

2. The surveillance camera system of claim 1 wherein said processing device identifies opposing ends of each of said pixel rows defining said privacy mask and each of said identified ends defines one of said vertices of said privacy mask.

3. The surveillance camera system of claim 1 wherein a user selects a plurality of boundary locations to define said privacy mask in said first field of view, said plurality of boundary locations selected by the user being less than n.

4. The surveillance camera system of claim 1 wherein said privacy mask defines a masked area completely encircling an unmasked area.

5. The surveillance camera system of claim 1 wherein adjustment of the field of view between said first field of view and said second field of view includes adjustment of a pan angle, a tilt angle and a focal length of said camera.

6. A surveillance camera system comprising:
a camera having an adjustable field of view;
a display screen displaying images acquired by said camera;
a processing device operably coupled to said camera and said display screen, said processing device configured to allow a user to define a privacy mask obscuring a portion of the displayed images, said processing device further configured to transform said privacy mask in accordance with changes in the field of view of said camera, wherein, in a first field of view, said privacy mask is defined by a plurality of vertices having coordinates (x1, y1), . . . (xn, yn), and, in a second field of view differing from said first field of view, said processing device determines transformed coordinates, (x1', y1'), . . . (xn', yn'), for each of said vertices based upon changes in the field of view of said camera wherein said privacy mask and said transformed privacy mask obscure substantially common subject matter in both said first field of view and said second field of view respectively; and
wherein said privacy mask in said first field of view is definable by a plurality of pixel blocks and said processing device is configured to identify at least one location point for each said pixel block, each of said location points defining one of said vertices of said privacy mask and wherein said privacy mask includes at least one non-perimeter pixel block entirely circumscribed by other pixel blocks forming a portion of said privacy mask, and wherein said processing device is programmed to determine a polygon defined by said vertices of said privacy mask and to infill said polygon to form said privacy mask without scanning an entire displayed image.

7. The surveillance camera system of claim 6 wherein a user selects a plurality of boundary locations to define said privacy mask in said first field of view, said plurality of boundary locations selected by the user being less than n.

8. The surveillance camera system of claim 6 wherein said pixel blocks all have a common size.

9. The surveillance camera system of claim 6 wherein each of said pixel blocks is formed by a single pixel.

10. The surveillance camera system of claim 6 wherein said privacy mask defines a masked area completely encircling an unmasked area.

11. The surveillance camera system of claim 6 wherein adjustment of the field of view between said first field of view and said second field of view includes adjustment of a pan angle, a tilt angle and a focal length of said camera.

12. A method of obscuring a selected portion of video images, said method comprising:
acquiring images with a camera;
displaying the acquired images on a display screen;
defining a privacy mask with a plurality of mask vertices having coordinates (x1, y1), . . . (xn, yn), the privacy mask obscuring a selected portion of the displayed images;
adjusting the field of view of the camera from a first field of view to a second field of view;
determining transformed coordinates, (x1', y1'), . . . (xn', yn'), for each of the mask vertices to define a transformed privacy mask for the second field of view, the transformed coordinates being determined based upon changes in the field of view of the camera wherein the privacy mask and the transformed privacy mask obscure substantially common subject matter in both the first field of view and the second field of view respectively;
determining a polygon defined by said mask vertices of said transformed privacy mask; and
infilling said polygon to provide said transformed privacy mask in the second field of view without scanning an entire displayed image;
wherein the privacy mask in the first field of view is definable by pixel rows and said step of defining the privacy mask with a plurality of mask vertices includes identifying opposing ends of a plurality of the pixel rows with each of the identified ends defining one of the mask vertices.

13. The method of claim 12 wherein the privacy mask is defined by a user selecting a plurality of boundary locations to define the privacy mask in the first field of view and wherein the plurality of boundary locations selected by the user is less than the number of mask vertices.

14. The method of claim 12 wherein the opposing ends of each of the pixel rows in the privacy mask are identified and define one of the mask vertices.

15. The method of claim 12 wherein said step of adjusting the field of view of the camera between the first field of view and the second field of view includes adjusting a pan angle, a tilt angle and a focal length of the camera.

16. A method of obscuring a selected portion of video images, said method comprising:
acquiring images with a camera;
displaying the acquired images on a display screen;
defining a privacy mask with a plurality of mask vertices having coordinates (x1, y1), . . . (xn, yn), the privacy mask obscuring a selected portion of the displayed images;
adjusting the field of view of the camera from a first field of view to a second field of view;
determining transformed coordinates, (x1', y1'), . . . (xn', yn'), for each of the mask vertices to define a transformed privacy mask for the second field of view, the transformed coordinates being determined based upon changes in the field of view of the camera wherein the privacy mask and the transformed privacy mask obscure substantially common subject matter in both the first field of view and the second field of view respectively;
determining a polygon defined by said mask vertices of said transformed privacy mask; and
infilling said polygon to provide said transformed privacy mask in the second field of view without scanning an entire displayed image;

wherein the privacy mask in the first field of view is definable by a plurality of pixel blocks and said step of defining the privacy mask with a plurality of mask vertices includes identifying a location point for each of the pixel blocks, each of the location points defining one of the mask vertices and wherein at least one of the pixel blocks is a non-perimeter pixel block entirely circumscribed by other pixel blocks forming a portion of the privacy mask.

17. The method of claim 16 wherein the pixel blocks all have a common size.

18. The method of claim 16 wherein each of the pixel blocks is formed by a single pixel.

19. The method of claim 16 wherein the privacy mask is defined by a user selecting a plurality of boundary locations to define the privacy mask in the first field of view and wherein the plurality of boundary locations selected by the user is less than the number of mask vertices.

20. The method of claim 16 wherein the privacy mask defines a masked area completely encircling an unmasked area.

21. The method of claim 16 wherein said step of adjusting the field of view of the camera between the first field of view and the second field of view includes adjusting a pan angle, a tilt angle and a focal length of the camera.

22. A surveillance camera system comprising:
a camera having an adjustable field of view;
a display screen displaying images acquired by said camera;
a processing device operably coupled to said camera and said display screen, said processing device configured to allow a user to define a privacy mask obscuring a portion of the displayed images, said privacy mask defining a masked area completely encircling an unmasked area, said processing device further configured to transform said privacy mask in accordance with changes in the field of view of said camera, wherein, in a first field of view, said privacy mask is defined by a plurality of vertices having coordinates (x1, y1), . . . (xn, yn), and, in a second field of view differing from said first field of view, said processing device determines transformed coordinates, (x1', y1'), . . . (xn', yn'), for each of said vertices based upon changes in the field of view of said camera wherein said privacy mask and said transformed privacy mask obscure substantially common subject matter in the masked area, while displaying substantially common subject matter in the unmasked area surrounded by the masked area of the privacy mask, in both said first field of view and said second field of view.

23. The surveillance camera system of claim 22 wherein said privacy mask in said first field of view is definable by pixel rows and said processing device is configured to identify opposing ends of a plurality of said pixel rows, each of said identified ends defining one of said vertices of said privacy mask.

24. The surveillance camera system of claim 22 wherein said privacy mask in said first field of view is definable by a plurality of pixel blocks and said processing device is configured to identify at least one location point for each said pixel block, each of said location points defining one of said vertices of said privacy mask and wherein said privacy mask includes at least one non-perimeter pixel block entirely circumscribed by other pixel blocks forming a portion of said privacy mask.

* * * * *